United States Patent
Tsai et al.

(10) Patent No.: US 8,274,941 B2
(45) Date of Patent: Sep. 25, 2012

(54) APPARATUS AND METHOD FOR SUBCARRIER SCRAMBLING

(75) Inventors: Chia-Lung Tsai, Hsinchu (TW); Jen-Yuan Hsu, Jincheng Township (TW); Pang-An Ting, Fongyuan (TW); Yu-Tao Hsieh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 551 days.

(21) Appl. No.: 12/537,282

(22) Filed: Aug. 7, 2009

(65) Prior Publication Data

US 2010/0119071 A1 May 13, 2010

Related U.S. Application Data

(60) Provisional application No. 61/113,136, filed on Nov. 10, 2008.

(51) Int. Cl.
*H04W 4/00* (2009.01)
*H04J 3/16* (2006.01)
*H04L 9/00* (2006.01)

(52) U.S. Cl. ......... 370/329; 370/341; 370/437; 380/268
(58) Field of Classification Search .................. 370/328, 370/329, 341, 437; 380/268
See application file for complete search history.

(56) References Cited

U.S. PATENT DOCUMENTS 4,213,101 A 7/1980 Policand et al.

OTHER PUBLICATIONS

DRAFT Standard for Local and metropolitan area networks, Part 16: Air Interface for Broadband Wireless Access Systems, P802.16Rev2/D1, Oct. 2007.

*Primary Examiner* — Ronald Abelson
(74) *Attorney, Agent, or Firm* — Finnegan, Henderson, Farabow, Garrett & Dunner, LLP

(57) ABSTRACT

A subcarrier scrambling method for use in a transmitter with multiple subcarriers, the transmitter being configured to allocate pilot symbols and data symbols for each of a plurality of resource units (RUs). The method includes: applying, for each of the plurality of RUs, a first intra RU sequence to the pilot symbols, to thereby generate a plurality of scrambled pilot symbols; applying, for each of the plurality of RUs, a second intra RU sequence to the data symbols, to thereby generate a plurality of scrambled data symbols; and combining the plurality of scrambled pilot symbols and the plurality of scrambled data symbols to form the plurality of RUs.

18 Claims, 9 Drawing Sheets

700

US 8,274,941 B2

APPARATUS AND METHOD FOR SUBCARRIER SCRAMBLING

RELATED APPLICATIONS

This application is based upon and claims the benefit of priority from U.S. Provisional Patent Application No. 61/113,136, filed Nov. 10, 2008, the entire contents of which are incorporated herein by reference.

FIELD OF THE DISCLOSURE

This disclosure relates to apparatus and methods for subcarrier scrambling.

BACKGROUND

Wireless communication techniques based on multiple subcarriers, such as an orthogonal frequency-division multiplexing (OFDM) technique, are gaining worldwide popularity due to their broad applications. For example, an OFDM based communication system may be used in a plurality of networks including Worldwide Interoperability for Microwave Access (WiMAX) networks, Wireless Fidelity (Wi-Fi) networks, Wireless Broadband (WiBro) networks, etc.

A transmitter in an OFDM based communication system may use a plurality of closely-spaced orthogonal subcarriers to carry data. For example, the transmitter may allocate the data on a plurality of parallel data channels, one for each of the subcarriers. Each of the subcarriers may be modulated with a conventional modulation scheme, e.g., quadrature amplitude modulation, at a relatively low symbol rate. In addition, the transmitter may perform an inverse fast Fourier transform (IFFT) on OFDM symbols representing the data to be transmitted, and transmit signals including the OFDM symbols to a receiver in the communication system. The receiver may perform a fast Fourier transform (FFT) on received signals to recover the OFDM symbols and, hence, the data.

The signals are transmitted from the transmitter to the receiver through a communication channel. In reality, the communication channel may have an effect on the signals when the signals are transmitted. The receiver may need knowledge of the communication channel to remove such effect, in order to accurately recover the data. To facilitate estimation of the communication channel, signals known to both the transmitter and the receiver, i.e., pilot symbols, may be inserted in OFDM symbols at the transmitter, such that the OFDM symbols include both data symbols and pilot symbols. The receiver may perform channel estimation based on resource units, also known as resource blocks, in the received signals, and each of the resource units includes a plurality of OFDM symbols and pilot symbols.

Traditionally, a cellular network may be used to provide wireless communications for a relatively wide area. For example, a cellular network is a radio network including a plurality of radio cells, or cells, each served by a transmitter, also known as a base station. The plurality of cells may cover a relatively wide area compared to the area covered by one cell.

FIG. 1 illustrates a block diagram of a traditional cellular network 100. The cellular network 100 includes a plurality of cells 102-1, 102-2, ..., and 102-N, served by transmitters 104-1, 104-2, ..., 104-N, respectively. For example, each of the cells 102-1, 102-2, ..., and 102-N may have an identification number used to identify the cell. Also for example, the transmitters 104-1, 104-2, ..., 104-N may transmit signals based on the OFDM technique.

To improve performance of the cellular network 100, each of the transmitters 104-1, 104-2, ..., 104-N may transmit signals in a plurality of segments/sectors in the cell which the transmitter serves. For example, the cells 102-1, 102-2, ..., and 102-N may each include a segment 106-1 having a first segment identification number, a second segment 106-2 having a second segment identification number, and a third segment 106-3 having a third segment identification number.

Traditionally, the transmitters 104-1, 104-2, ..., 104-N may use a same carrier frequency to transmit signals in segments that have a same segment identification number. For example, the transmitters 104-1, 104-2, ..., 104-N may use a same carrier frequency to transmit signals in the segments 106-1 of the cells 102-1, 102-2, ..., and 102-N, respectively. As a result, if it is intended that a receiver in the cell 102-1 should receive signals transmitted from the transmitter 104-1, that receiver may also receive signals that have the same carrier frequency and are transmitted from one or more of the transmitters 104-2, ..., and 104-N, which may cause co-channel-interference (CCI) at the receiver.

To enhance spectrum efficiency, a fractional frequency reuse (FFR) scheme may be used in a cellular network. FIG. 2 illustrates a block diagram of a traditional cellular network 200 based on the FFR scheme. The cellular network 200 includes a plurality of cells 202-1, 202-2, ..., and 202-N, served by transmitters 204-1, 204-2, ..., 204-N, respectively. Similar to the cellular network 100 (FIG. 1), each of the cells 202-1, 202-2, ..., and 202-N may include a first segment 206-1 having a first segment identification number, a second segment 206-2 having a second segment identification number, and a third segment 206-3 having a third segment identification number. In addition, based on the FFR scheme, each segment may further include a plurality of FFR units each having an FFR identification number. For example, for a 2-FFR scheme, each segment may further include two FFR units. Also for example, for a 3-FFR scheme, each segment may further include three FFR units. In FIG. 2, each segment is illustrated as having two FFR units A and A', B and B', or C and C'.

The FFR units in the same segment also use the same carrier frequency. As a result, if it is intended that a receiver in the cell 202-1 should receive signals transmitted from the transmitter 204-1, that receiver may also receive signals that have the same carrier frequency and are transmitted from one or more of the transmitters 204-2, ..., and 204-N, which may cause CCI at the receiver.

SUMMARY

According to a first aspect of the present disclosure, there is provided a subcarrier scrambling method for use in a transmitter with multiple subcarriers, the transmitter being configured to allocate pilot symbols and data symbols for each of a plurality of resource units (RUs), the method comprising: applying, for each of the plurality of RUs, a first intra RU sequence to the pilot symbols, to thereby generate a plurality of scrambled pilot symbols; applying, for each of the plurality of RUs, a second intra RU sequence to the data symbols, to thereby generate a plurality of scrambled data symbols; and combining the plurality of scrambled pilot symbols and the plurality of scrambled data symbols to form the plurality of RUs.

According to a second aspect of the present disclosure, there is provided subcarrier scrambling apparatus for use in a transmitter with multiple subcarriers, the transmitter being configured to allocate pilot symbols and data symbols for each of a plurality of resource units (RUs), the apparatus comprising: a first multiplier configured to apply, for each of the plurality of RUs, a first intra RU sequence to the pilot symbols, to thereby generate a plurality of scrambled pilot symbols; a second multiplier configured to apply, for each of the plurality of RUs, a second intra RU sequence to the data symbols, to thereby generate a plurality of scrambled data symbols; and a combiner configured to combine the plurality of scrambled pilot symbols and the plurality of scrambled data symbols to form the plurality of RUs.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Figure 3:
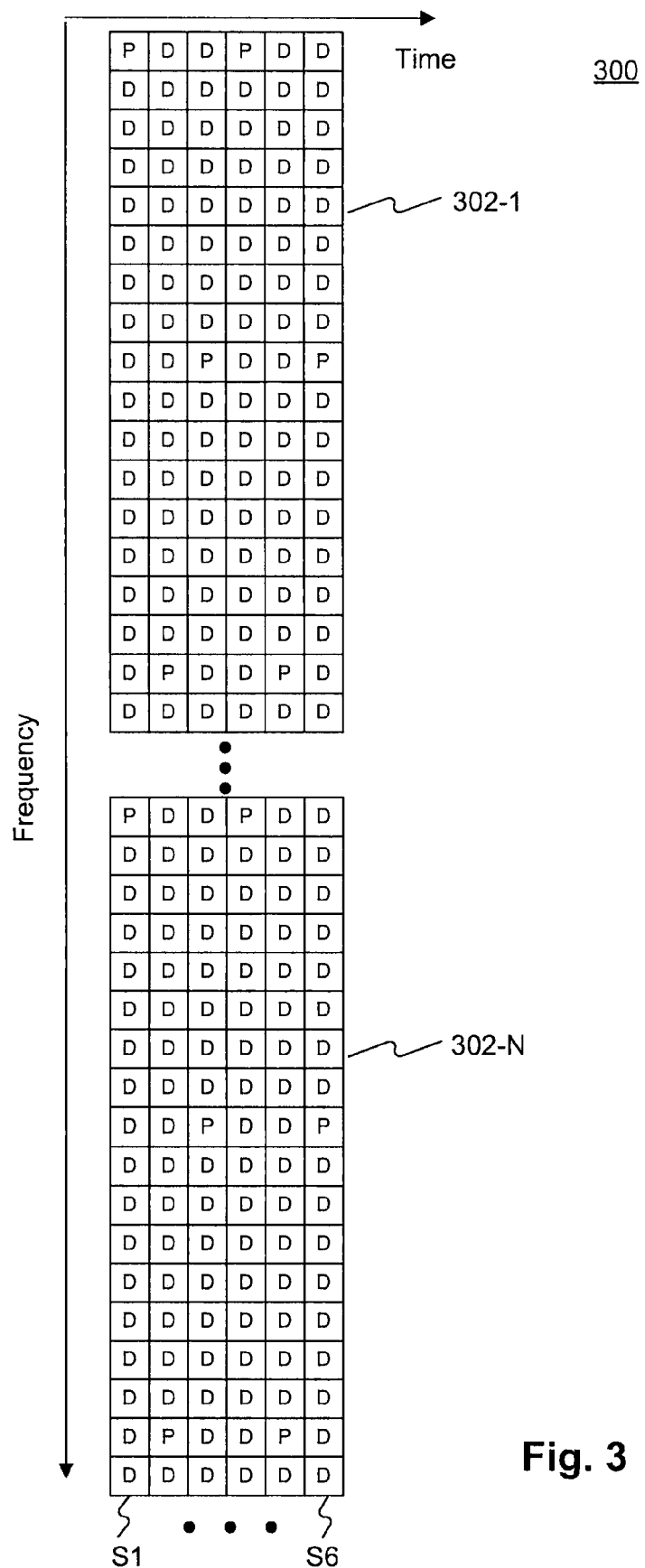
FIG. 3 illustrates a subcarrier scrambling method, according to an exemplary embodiment.

FIG. 3 illustrates a subcarrier scrambling method 300 for use by a transmitter serving a cell, according to an exemplary embodiment. For example, the transmitter may include multiple subcarriers, and use an orthogonal frequency-division multiplexing (OFDM) technique to transmit data. The transmitter may use the subcarrier scrambling method 300 to generate scrambled pilot and data symbols.

In exemplary embodiments, the data to be transmitted during a time period may be represented by a plurality of resource units (RUs)/resource blocks 302-1, ..., 302-N shown in a time-frequency domain. For example, an RU is a representation of pilot and data symbols included in a plurality of contiguous OFDM symbols. Each row of the RU corresponds to a subcarrier of the transmitter, and each column of the RU corresponds to an OFDM symbol or a time. In the illustrated embodiment, the RUs 302-1, ..., 302-N correspond to OFDM symbols S1, S2, ..., S6. Each of the RUs 302-1, ..., 302-N includes a plurality of data symbols, each represented by a small block with a letter "D," and a plurality of pilot symbols, each represented by a small block with a letter "P."

In exemplary embodiments, for each of the RUs 302-1, ..., 302-N, a first intra RU sequence may be applied to original pilot symbols to generate the scrambled pilot symbols. The first intra RU sequence may be a sequence including a plurality of elements, each applied to one of the original pilot symbols for an RU. For example, each of the elements in the first intra RU sequence may be either +1 or −1, and may be multiplied with one of the original pilot symbols for an RU. Also for example, if six original pilot symbols are to be allocated for an RU, the first intra RU sequence may include six elements, such as +1, −1, −1, +1, +1, −1. Further for example, the first intra RU sequence may be generated by optimizing a random sequence, which may be generated by a pseudo random binary sequence (PRBS) generator, as described below. Applying the first intra RU sequence to the original pilot symbols for each RU may reduce co-channel-interference (CCI) at a receiver.

In exemplary embodiments, for each of the RUs 302-1, ..., 302-N, a second intra RU sequence may be applied to original data symbols to generate the scrambled data symbols. The second intra RU sequence may be a sequence including a plurality of elements, each applied to one of the original data symbols for an RU. For example, each of the elements in the second intra RU sequence may be either +1 or −1, and may be multiplied with one of the original data symbols for an RU. Also for example, the second intra RU sequence may be generated by a PRBS generator, as described below.

In exemplary embodiments, an inter RU sequence may or may not be further applied to the RUs 302-1, ..., 302-N. The inter RU sequence may be a sequence including a plurality of elements, each applied to one of the RUs 302-1, ..., 302-N. For example, each of the elements in the inter RU sequence may be either +1 or −1, and may be multiplied with each of the scrambled pilot symbols and each of the scrambled data symbols in an RU. Applying the inter RU sequence to the RUs 302-1, ..., 302-N may reduce a peak-to-average-power ratio (PAPR) for signals to be transmitted by the transmitter.

Figure 4:
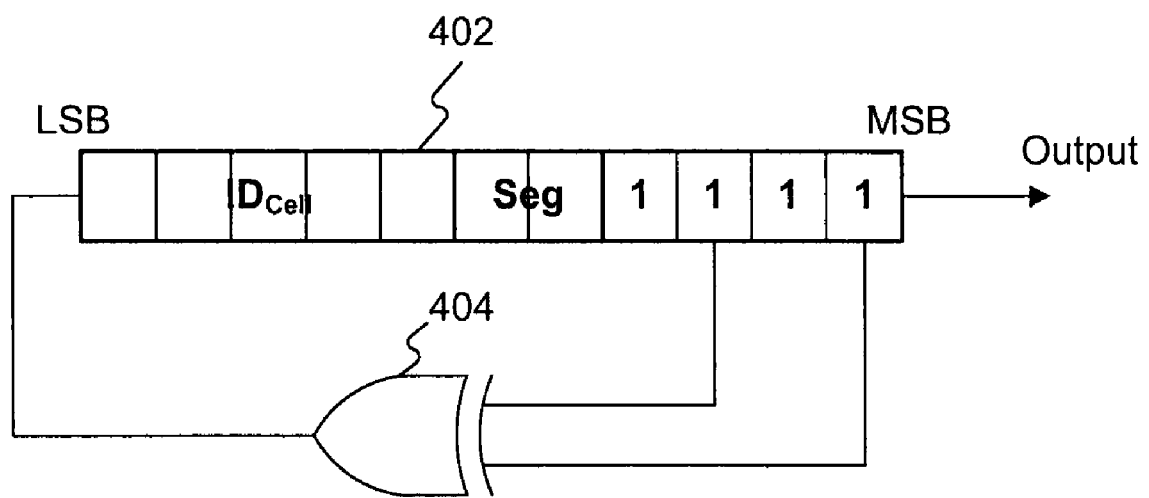
FIG. 4 illustrates a block diagram of a pseudo random binary sequence (PRBS) generator, according to an exemplary embodiment.

FIG. 4 illustrates a block diagram of a pseudo random binary sequence (PRBS) generator 400, according to an exemplary embodiment. The PRBS generator 400 may include a register 402 and an exclusive or (XOR) gate 404. The register 402 is configured to store a plurality of bits, wherein a first one of the plurality of bits corresponds to the least significant bit (LSB) and a last one of the plurality bits corresponds to the most significant bit (MSB).

In exemplary embodiments, the PRBS generator 400 is configured to generate a random sequence based on bits initially stored in the register 402. The initially stored bits may include first, second, and third pluralities of bits. For example, the first plurality of bits initially stored in the register 402 may correspond to a cell identification number $ID_{cell}$, as shown in FIG. 4. Also for example, the second plurality of bits initially stored in the register 402 may correspond to a number of segments in a cell, referred to herein as Seg, as shown in FIG. 4. Further for example, the third plurality of bits initially stored in the register 402 may correspond to an FFR unit identification number (not shown). Remaining bits initially stored in the register 402 may be 1s, as shown in FIG. 4.

During operation, the PRBS generator 400 may output one of the stored bits, e.g., the MSB, to be a first element of the random sequence. The PRBS generator 400 may further perform a shift on the bits stored in the register 402 such that, except the MSB, each bit is shifted from a current position into a next position in the register 402. The PRBS generator 400 may further use the XOR gate 404 to perform an XOR operation on two of the stored bits to generate a bit to be stored in the register 402, and the generated bit becomes the LSB of the stored bits. As the above-described process repeats, the PRBS generator 400 may generate the random sequence.

Figure 1:
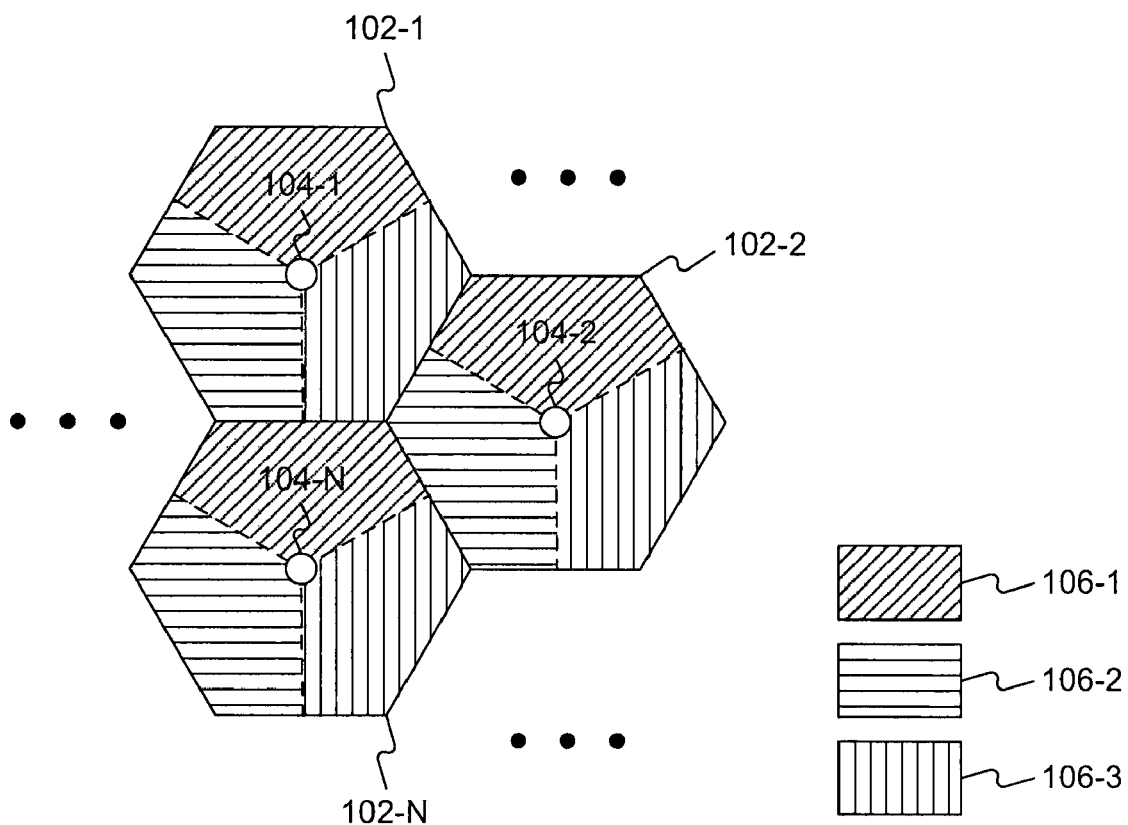
FIG. 1 illustrates a block diagram of a traditional cellular network.
Figure 5:
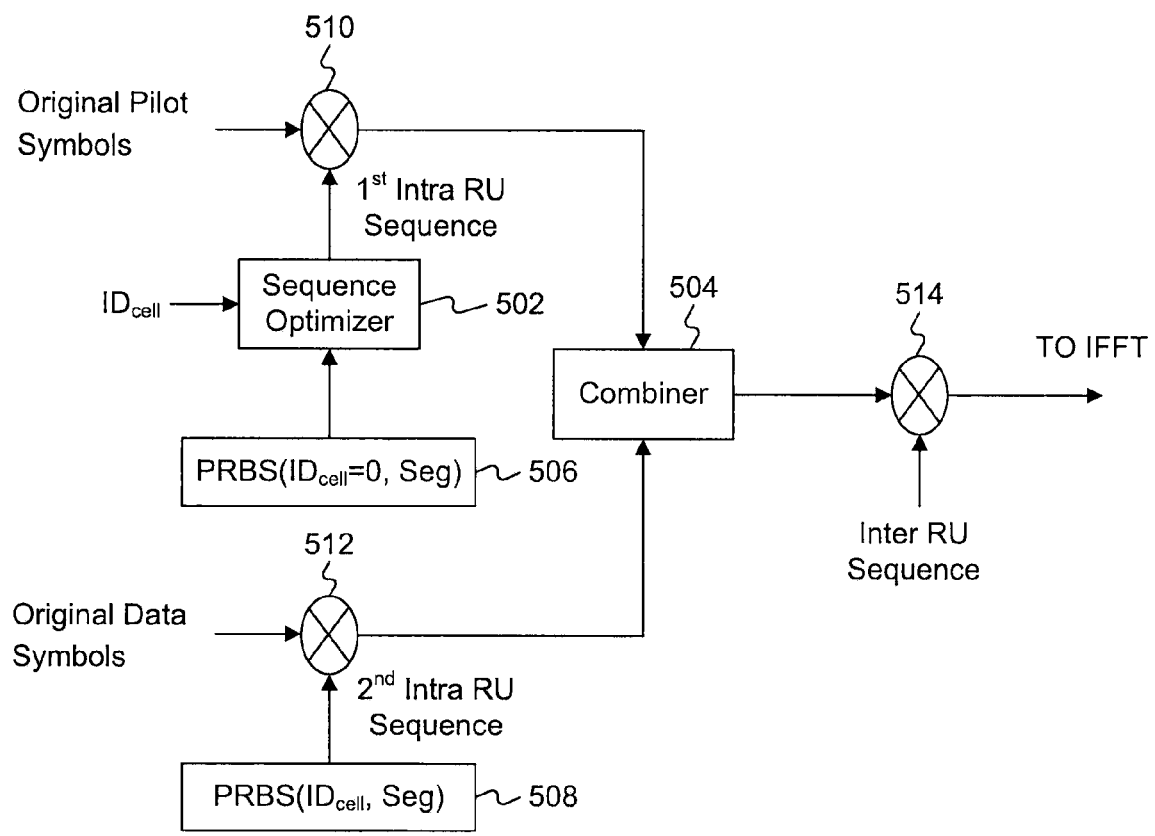
FIG. 5 illustrates a block diagram of a subcarrier scrambling apparatus, according to an exemplary embodiment.

FIG. 5 illustrates a block diagram of a subcarrier scrambling apparatus 500, according to an exemplary embodiment. For example, the apparatus 500 may be used in a transmitter, such as the transmitter 104-1, 104-2, . . . , or 104-N (FIG. 1), and may perform subcarrier scrambling in accordance with the subcarrier scrambling method 300 (FIG. 3). The apparatus 500 includes a sequence optimizer 502, a combiner 504, first and second PRBS generators 506 and 508, and first, second, and third multipliers 510, 512, and 514. For example, the PRBS generator 506 or 508 operates in a manner similar to the PRBS generator 400 (FIG. 4). Also for example, the sequence optimizer 502, the combiner 504, and the multipliers 510, 512, and 514 may be implemented using hardware.

In exemplary embodiments, the PRBS generator 506 is configured to generate a first random sequence based on a number of segments Seg in a cell which the transmitter serves. For example, a first plurality of bits initially stored in a register of the PRBS generator 506, which correspond to a cell identification number, may be set to be zeros. Also for example, a second plurality of bits initially stored in the register of the PRBS generator 506, which correspond to a number of segments in a cell, may be set to be the number of segments Seg in the cell which the transmitter serves. In this manner, the PRBS generator 506 generates the first random sequence.

The sequence optimizer 502 is configured to optimize the first random sequence generated by the PRBS generator 506, to thereby generate a first intra RU sequence. For example, the sequence optimizer 502 may optimize the first random sequence based on an identification number $ID_{cell}$ of the cell which the transmitter serves, in accordance with an optimization method described below. If the identification number of the cell is zero, the sequence optimizer 502 may output the first random sequence as the first intra RU sequence.

The multiplier 510 is configured to multiply, for each RU, the first intra RU sequence with original pilot symbols, e.g., a plurality of 1s, to thereby generate a plurality of scrambled pilot symbols, as described above.

The PRBS generator 508 is configured to generate a second random sequence to be a second intra RU sequence, based on the identification number $ID_{cell}$ of the cell which the transmitter serves and the number of segments Seg in the cell. For example, a first plurality of bits initially stored in a register of the PRBS generator 508, which correspond to a cell identification number, may be set to be the identification number $ID_{cell}$ of the cell. Also for example, a second plurality of bits initially stored in the register of the PRBS generator 508, which correspond to a number of segments in a cell, may be set to be the number of segments Seg in the cell which the transmitter serves. In this manner, the PRBS generator 508 generates the second intra RU sequence.

The multiplier 512 is configured to multiply, for each RU, the second intra RU sequence with original data symbols, to thereby generate a plurality of scrambled data symbols, as described above.

The combiner 504 is configured to combine the plurality of scrambled pilot symbols and the plurality of scrambled data symbols, to form a plurality of RUs. The multiplier 514 may then multiply an inter RU sequence with the plurality of RUs, as described above, to generate RUs to be transmitted. The RUs to be transmitted may then be sent to, e.g., an inverse fast Fourier transformer (IFFT) for further processing. For example, the inter RU sequence may be generated by a PRBS generator (not shown), which is configured to generate a random sequence to be the inter RU sequence, based on the identification number $ID_{cell}$ of the cell and the number of segments Seg in the cell.

Figure 2:
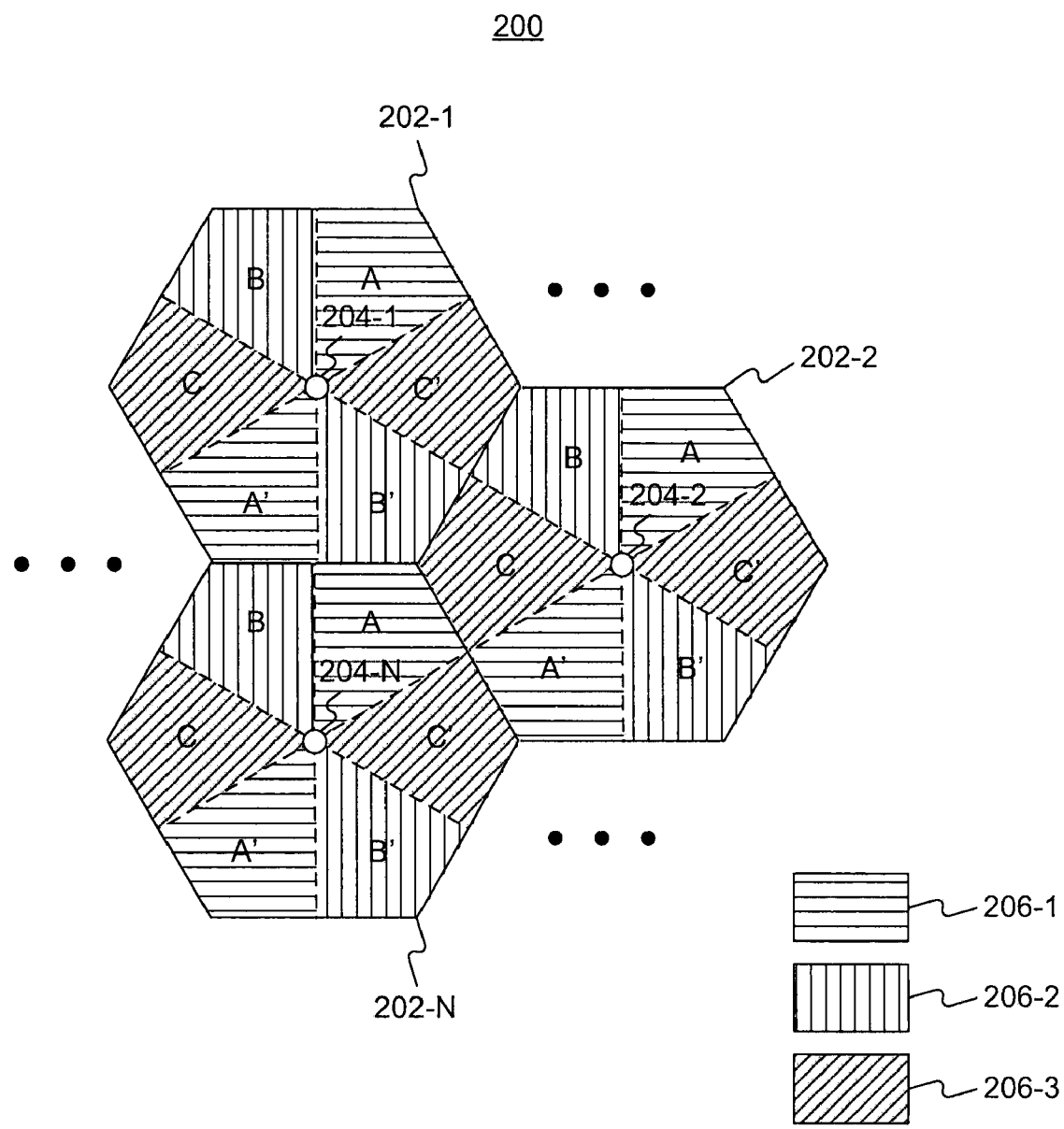
FIG. 2 illustrates a block diagram of a traditional cellular network based on a fractional frequency reuse (FFR) scheme.
Figure 6:
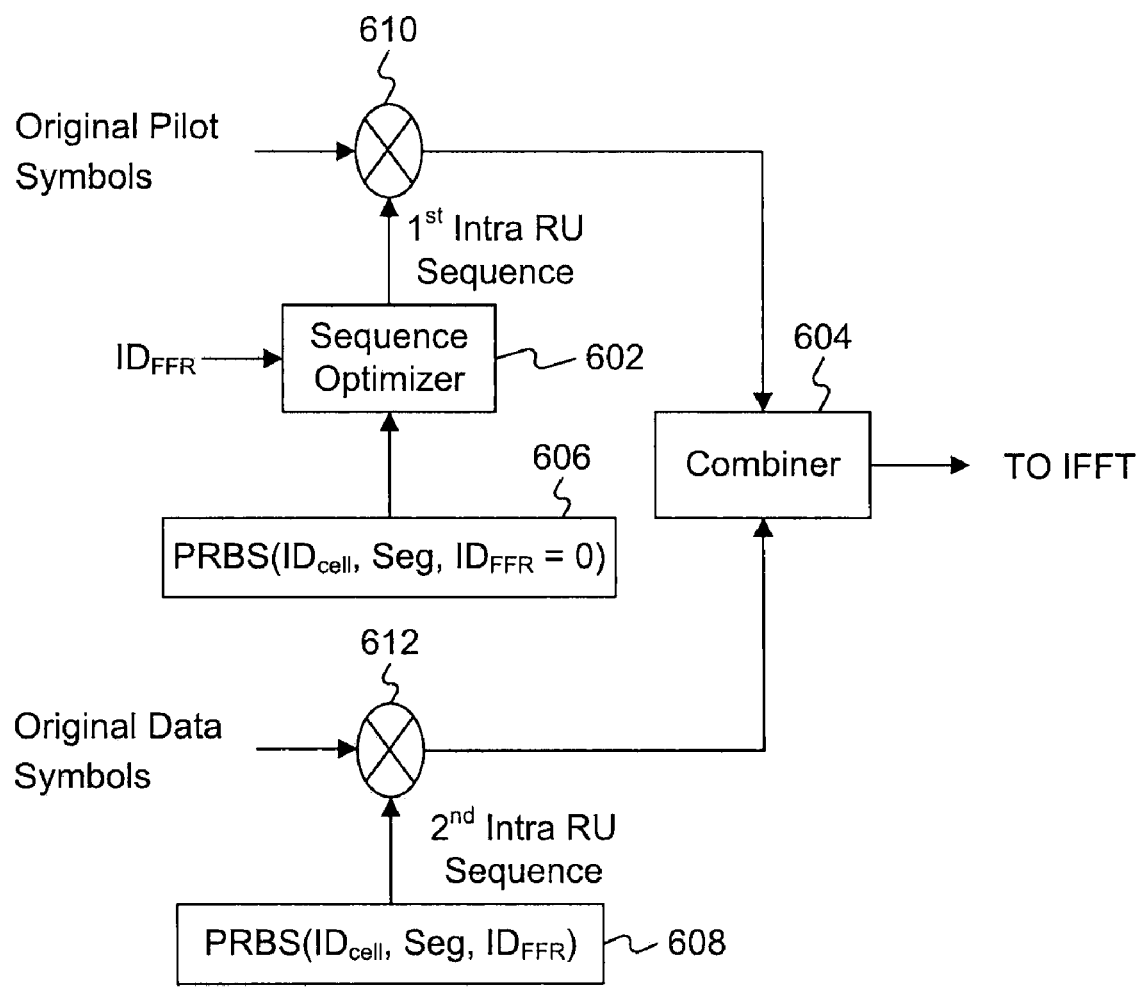
FIG. 6 illustrates a block diagram of a subcarrier scrambling apparatus, according to an exemplary embodiment.

FIG. 6 illustrates a block diagram of a subcarrier scrambling apparatus 600, according to an exemplary embodiment. For example, the apparatus 600 may be used in a transmitter based on a fractional frequency reuse (FFR) scheme, such as the transmitter 204-1, 204-2, . . . , or 204-N (FIG. 2), and may perform subcarrier scrambling in accordance with the subcarrier scrambling method 300 (FIG. 3). For example, the apparatus 600 may include a sequence optimizer 602, a combiner 604, first and second PRBS generators 606 and 608, and first and second multipliers 610 and 612. For example, the PRBS generator 606 or 608 operates in a manner similar to the PRBS generator 400 (FIG. 4).

The PRBS generator 606 is configured to generate a first random sequence based on a cell identification number $ID_{cell}$ of a cell which the transmitter serves and a number of segments Seg in the cell. For example, a first plurality of bits initially stored in a register of the PRBS generator 606, which correspond to a cell identification number, may be set to be the cell identification number $ID_{cell}$ of the cell. Also for example, a second plurality of bits initially stored in the register of the PRBS generator 606, which correspond to a number of segments in a cell, may be set to be the number of segments Seg in the cell which the transmitter serves. Further for example, a third plurality of bits initially stored in the register of the PRBS generator 606, which correspond to an FFR identification number, may be set to be zeros. In this manner, the PRBS generator 606 may generate the first random sequence.

The sequence optimizer 602 is configured to optimize the first random sequence generated by the PRBS generator 606, to thereby generate a first intra RU sequence. For example, the sequence optimizer 602 may optimize the first random sequence based on an identification number $ID_{FFR}$ of an FFR unit in which the transmitter is to transmit signals, in accordance with the optimization method described below. If the identification number $ID_{FFR}$ of the FFR unit in which the transmitter is to transmit signals is zero, the sequence optimizer 602 may output the first random sequence as the first intra RU sequence.

The multiplier 610 is configured to multiply, for each RU, the first intra RU sequence with original pilot symbols, e.g., a plurality of 1s, to thereby generate a plurality of scrambled pilot symbols, as described above.

The PRBS generator 608 is configured to generate a second random sequence to be a second intra RU sequence, based on the cell identification number $ID_{cell}$ of the cell, the number of segments Seg in the cell, and the FFR unit identification number $ID_{FFR}$ of the FFR unit. For example, a first plurality of bits initially stored in a register of the PRBS generator 608, which correspond to a cell identification number, may be set to be the cell identification number $ID_{cell}$ of the cell. Also for example, a second plurality of bits initially stored in the register of the PRBS generator 608, which correspond to a number of segments in a cell, may be set to be the number of segments Seg in the cell which the transmitter serves. Further for example, a third plurality of bits initially stored in the register of the PRBS generator 608, which correspond to an FFR identification number, may be set to be the FFR unit identification number $ID_{FFR}$ of the FFR unit.

The multiplier 612 is configured to multiply, for each RU, the second sequence with original data symbols, to thereby generate a plurality of scrambled data symbols, as described above.

The combiner 604 is configured to combine the plurality of scrambled pilot symbols and the plurality of scrambled data symbols, to thereby form a plurality of RUs. The plurality of RUs may then be sent to, e.g., an inverse fast Fourier transformer (IFFT) for further processing.

In exemplary embodiments, an optimization method may be used to generate the first intra RU sequence. The optimization method may be based on reducing CCI at a receiver. For example, N cells, such as the cells 102-2, ..., 102-N (FIG. 1), each include a transmitter. A receiver in a first one of the N cells is configured to receive a signal from a first transmitter in the first one of the N cells, which is the signal that the receiver intends to receive. However, the receiver may also receive signals from other transmitters in other ones of the N cells, since the first transmitter and the other transmitters, although in different cells, may use the same carrier frequency to transmit signals in segments that have the same segment identification number. The signals received from the other transmitters may cause CCI at the receiver in the first cell.

In one exemplary embodiment, the receiver in the first cell is assumed to receive signals from transmitters in L cells of the N cells, including the first transmitter. For example, signals received by the receiver may be expressed as follows:

$$y_p = p_1 h_1 + \sum_{i=2}^{L} p_i h_i + n, \qquad \text{equation (1)}$$

where $y_p$ denotes the received signals; $p_i$ (i=1, 2, ..., L) denotes pilot signals transmitted from the transmitter in an $i^{th}$ one of the L cells; $h_i$ denotes frequency responses of communication channels; and n denotes noise signals. For illustrative purposes only, only pilot signals are included in the received signals $y_p$.

At the receiver, a least square (LS) estimation of the communication channels between the first transmitter and the receiver is calculated as follows:

$$h_{LS} = h_1 + \sum_{i=2}^{L} p_1^{-1} p_i h_i + p_1^{-1} n, \qquad \text{equation (2)}$$

where $h_{LS}$ denotes an LS estimation of the frequency responses of the communication channels between the first transmitter and the receiver.

A minimum mean square error (MMSE) estimation of the communication channel between the first transmitter and the receiver is further expressed as follows:

$$h_{MMSE,k} = W_k^H h_1 + W_k^H \sum_{i=2}^{L} p_1^{-1} p_i h_i + W_k^H p_1^{-1} n, \qquad \text{equation (3)}$$

where $h_{MMSE,k}$ denotes an MMSE estimation of the frequency responses of the communication channels between the first transmitter and the receiver, and $W_k^H$ denotes weights each for one of the communication channels between the first transmitter and the receiver, and such weights may be predetermined.

In the illustrated embodiment, the term $$W_k^H \sum_{i=2}^{L} p_1^{-1} p_i h_i$$

in equation (3) is an interference term corresponding to CCI caused by the signals transmitted from the other transmitters, i.e., the transmitters excluding the first transmitter. Therefore, if the term $$W_k^H \sum_{i=2}^{L} p_1^{-1} p_i h_i$$

is minimized, the CCI caused by the signals transmitted from the other transmitters may be reduced.

In one exemplary embodiment, each of the transmitters in the L cells allocates six pilot symbols for each RU. Accordingly, the pilot signals from the first transmitter may be expressed as follows:

$$p_1 = \begin{bmatrix} p_{1,1} & 0 & 0 & 0 & 0 & 0 \\ 0 & p_{1,2} & 0 & 0 & 0 & 0 \\ 0 & 0 & p_{1,3} & 0 & 0 & 0 \\ 0 & 0 & 0 & p_{1,4} & 0 & 0 \\ 0 & 0 & 0 & 0 & p_{1,5} & 0 \\ 0 & 0 & 0 & 0 & 0 & p_{1,6} \end{bmatrix}. \qquad \text{equation (4)}$$

The pilot signals from the $i^{th}$ transmitter may be expressed as follows:

$$p_i = \begin{bmatrix} p_{i,1} & 0 & 0 & 0 & 0 & 0 \\ 0 & p_{i,2} & 0 & 0 & 0 & 0 \\ 0 & 0 & p_{i,3} & 0 & 0 & 0 \\ 0 & 0 & 0 & p_{i,4} & 0 & 0 \\ 0 & 0 & 0 & 0 & p_{i,5} & 0 \\ 0 & 0 & 0 & 0 & 0 & p_{i,6} \end{bmatrix}. \qquad \text{equation (5)}$$

The frequency responses of the communication channels between the transmitter in the $i^{th}$ cell and the receiver may be expressed as follows:

$$h_i = \begin{bmatrix} h_{i,1} \\ h_{i,2} \\ h_{i,3} \\ h_{i,4} \\ h_{i,5} \\ h_{i,6} \end{bmatrix}.$$ equation (6)

Based on equations (4)-(6), $W_k^H p_1^{-1} p_i h_i$ may be expressed as follows:

$$W_k^H p_1^{-1} p_i h_i = W_1 p_{1,1} p_{i,1} h_{i,1} + W_2 p_{1,2} p_{i,2} h_{i,2} + W_3 p_{1,3} p_{i,3} h_{i,3} + W_4 p_{1,4} p_{i,4} h_{i,4} + W_5 p_{1,5} p_{i,5} h_{i,5} + W_6 p_{1,6} p_{i,6} h_{i,6}.$$ equation (7)

In the illustrated embodiment, the communication channels between the transmitter in the $i^{th}$ cell and the receiver are flatting channels, i.e., $h_{i,1} = h_{i,2} = h_{i,3} = h_{i,4} = h_{i,5} = h_{i,6} = h'$. Therefore, equation (7) is rewritten as follows:

$$W_k^H p_1^{-1} p_i h_i = h'(W_1 p_{1,1} p_{i,1} + W_2 p_{1,2} p_{i,2} + W_3 p_{1,3} p_{i,3} + W_4 p_{1,4} p_{i,4} + W_5 p_{1,5} p_{i,5} + W_6 p_{1,6} p_{i,6}.$$ equation (8)

Accordingly, if equation (9) shown below is minimized for each value of i, the term $$W_k^H \sum_{i=2}^{L} p_1^{-1} p_i h_i$$

in equation (3) is minimized.

$$W_1 p_{1,1} p_{i,1} + W_2 p_{1,2} p_{i,2} + W_3 p_{1,3} p_{i,3} + W_4 p_{1,4} p_{i,4} + W_5 p_{1,5} p_{i,5} + W_6 p_{1,6} p_{i,6}.$$ equation (9)

Correspondingly, the CCI caused by the signals transmitted by the other transmitters may be reduced.

Figure 7A:
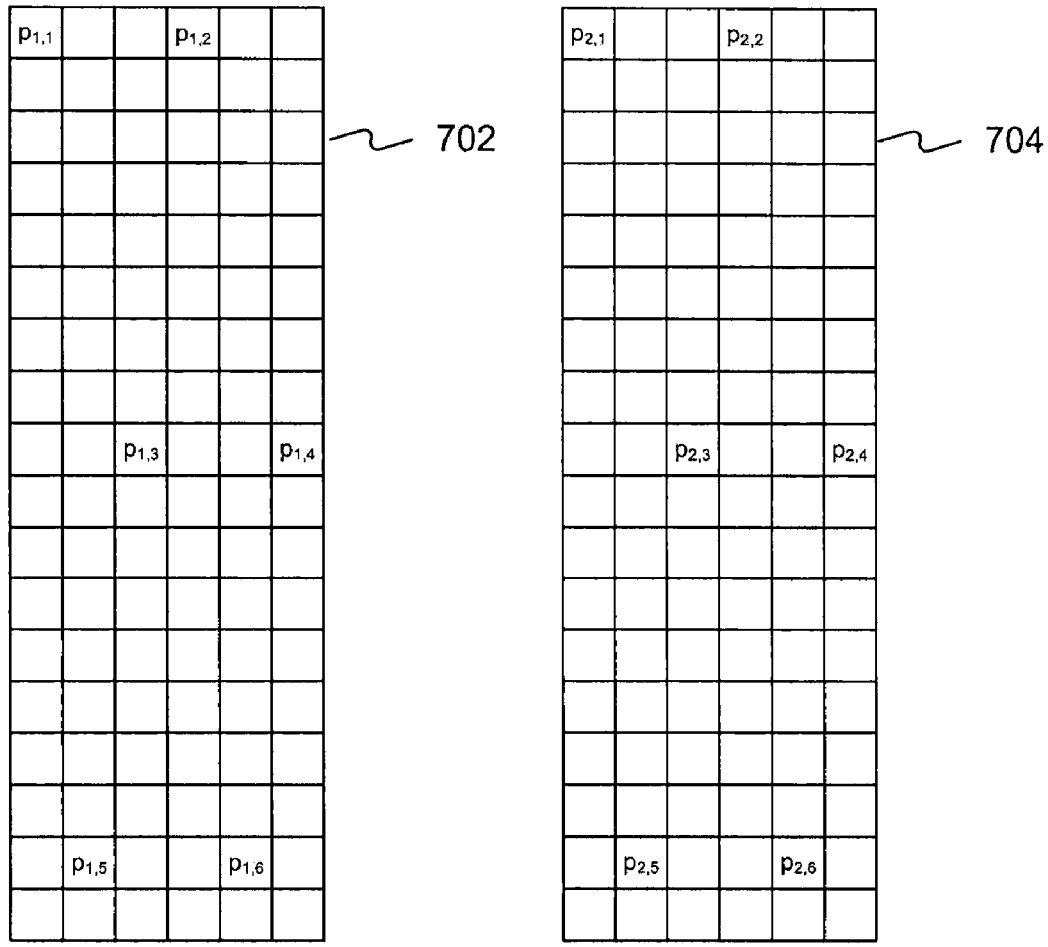
FIGS. 7A and 7B show intra resource unit (RU) sequences generated based on an optimization method, according to an exemplary embodiment.
Figure 7B:
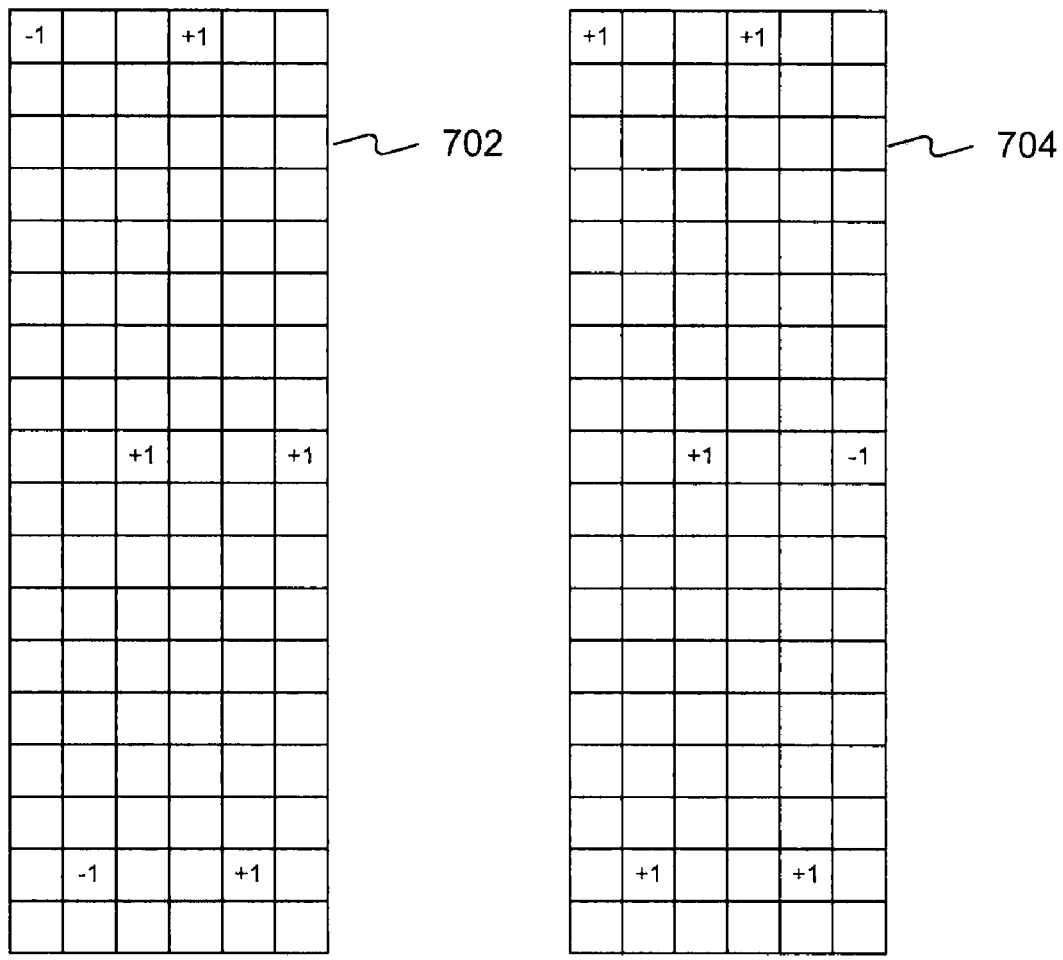

FIGS. 7A and 7B show exemplary intra RU sequences generated based on the above-described optimization method for pilot symbols, according to an exemplary embodiment. For example, a first transmitter in a first cell may allocate six pilot symbols, e.g., $p_{1,1}, p_{1,2}, p_{1,2}, p_{1,3}, p_{1,4}, p_{1,5}, p_{1,6}$, for each RU, and a second transmitter in a second cell may also allocate six pilot symbols, e.g., $p_{2,1}, p_{2,2}, p_{2,3}, p_{2,4}, p_{2,5}, p_{2,6}$, for each RU. For convenience of illustration, these pilot symbols are shown in first and second RUs 702 and 704, respectively, as shown in FIG. 7A. Accordingly, equation (9) may be expressed as follows:

$$W_1 p_{1,1} p_{2,1} + W_2 p_{1,2} p_{2,2} + W_3 p_{1,3} p_{2,3} + W_4 p_{1,4} p_{2,4} + W_5 p_{1,5} p_{2,5} + W_6 p_{1,6} p_{2,6}.$$ equation (10)

In one exemplary embodiment, $p_{1,1}, p_{1,2}, p_{1,3}, p_{1,4}, p_{1,5}, p_{1,6}$ and $p_{2,1}, p_{2,2}, p_{2,3}, p_{2,4}, p_{2,5}, p_{2,6}$ are designed to have the values shown in FIG. 7B. Therefore equation (10) becomes:

$$-W_1 + W_2 + W_3 - W_4 - W_5 + W_6.$$ equation (11)

Equation (11) includes an equal number of positive values, i.e., $W_2$, $W_3$, and $W_6$, and negative values, i.e., $-W_1$, $-W_4$, and $-W_5$. Therefore, equation (10) may be minimized.

Typically, the original pilot symbols before applying an intra RU sequence are 1s. Therefore, if a sequence optimizer of subcarrier scrambling apparatus in the first transmitter may optimize a random sequence to generate an intra RU sequence equal to the values shown in the RU 702 (FIG. 7B), i.e., -1, +1, +1, +1, -1, +1, and a sequence optimizer of subcarrier scrambling apparatus in the second transmitter may optimize a random sequence to generate an intra RU sequence equal to the values shown in the RU 704 (FIG. 7B), i.e., +1, +1, +1, +1, -1, +1, +1, CCI may be reduced at receivers in the first and second cells.

Similarly, when the first and second transmitters are each configured to transmit signals based on the FFR scheme, such as the 2-FFR scheme, the sequence optimizer in the first transmitter may optimize a random sequence to generate an intra RU sequence for pilot symbols, e.g., equal to the values shown in the RU 702 (FIG. 7B), and the sequence optimizer in the second transmitter may optimize a random sequence to generate an intra RU sequence for pilot symbols, e.g., equal to the values shown in the RU 704 (FIG. 7B). As a result, CCI may be reduced at receivers in the first and second cells.

Figure 8:
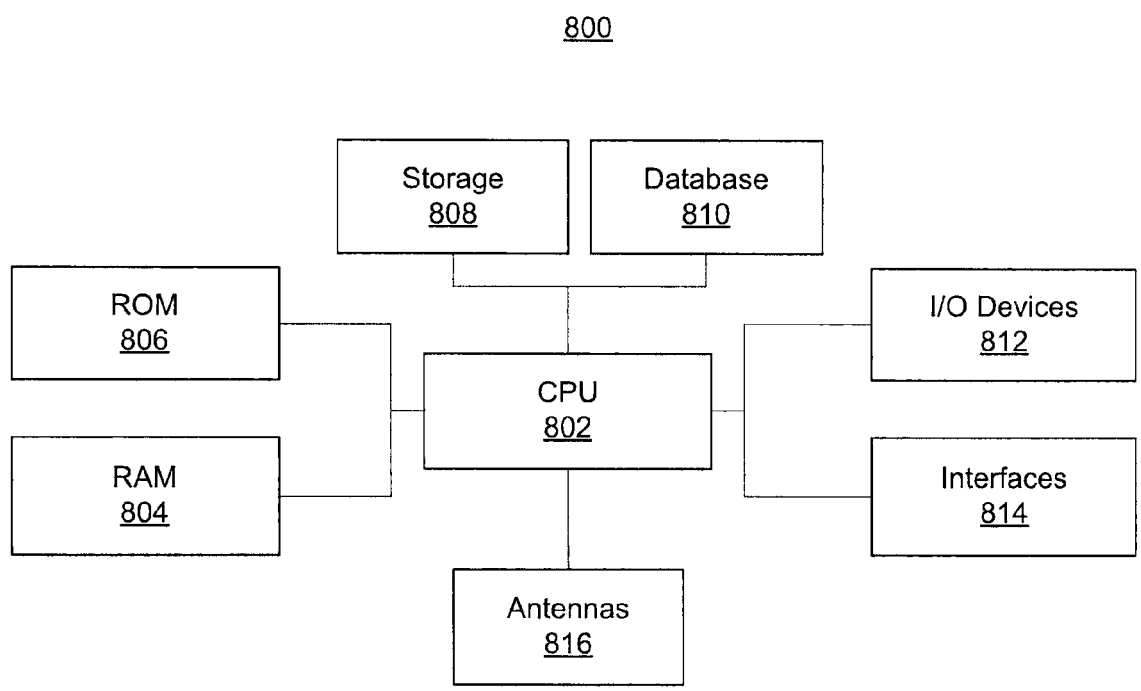
FIG. 8 illustrates a block diagram of an exemplary transmitter, according to an exemplary embodiment.

FIG. 8 illustrates a block diagram of an exemplary transmitter 800, according to an exemplary embodiment. For example, the transmitter 800 may be the transmitter noted above in explanation of FIGS. 3 and 5-7B. Referring to FIG. 8, the transmitter 800 may include one or more of the following components: a central processing unit (CPU) 802 configured to execute computer program instructions to perform various processes and methods, random access memory (RAM) 804 and read only memory (ROM) 806 configured to access and store information and computer program instructions, storage 808 to store data and information, databases 810 to store tables, lists, or other data structures, I/O devices 812, interfaces 814, antennas 816, etc. Each of these components is well-known in the art and will not be discussed further.

Other embodiments of the invention will be apparent to those skilled in the art from consideration of the specification and practice of the invention disclosed herein. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A subcarrier scrambling method for use in a transmitter with multiple subcarriers, the transmitter being configured to allocate pilot symbols and data symbols for each of a plurality of resource units (RUs), the method comprising:
    applying, for each of the plurality of RUs, a first intra RU sequence to the pilot symbols, to thereby generate a plurality of scrambled pilot symbols;
    applying, for each of the plurality of RUs, a second intra RU sequence to the data symbols, to thereby generate a plurality of scrambled data symbols; and
    combining the plurality of scrambled pilot symbols and the plurality of scrambled data symbols to form the plurality of RUs;
    wherein the transmitter is configured to serve a cell including one or more segments, the method further comprising:
    generating a first random sequence based on a number of segments in the cell; and
    generating the first intra RU sequence based on the first random sequence and a cell identification number of the cell.

2. The method of claim 1, further comprising:
    applying an inter RU sequence to the plurality of RUs.

3. The method of claim 1, wherein the first intra RU sequence includes a plurality of elements, the applying of the first intra RU sequence for a first one of the plurality of RUs comprising:
multiplying the plurality of elements with the pilot symbols for the first one of the plurality of RUs, respectively.

4. The method of claim 1, further comprising generating the first random sequence using a pseudo random binary sequence (PRBS) generator.

5. The method of claim 1, wherein the generating of the first intra RU sequence comprises performing a minimum mean square error (MMSE) estimation of communication channels between the transmitter and a receiver.

6. The method of claim 1, wherein the generating of the first intra RU sequence comprises:
determining weights for communication channels; and
generating the first intra RU sequence based on the determined weights.

7. The method of claim 1, wherein the transmitter is configured to transmit signals in a fractional frequency reuse (FFR) unit, the method further comprising:
generating a second random sequence based on the cell identification number of the cell and the number of segments in the cell; and
generating the first intra RU sequence based on the second random sequence and an FFR unit identification number of the FFR unit.

8. The method of claim 1, wherein the second intra RU sequence includes a plurality of elements, the applying of the second intra RU sequence for a first one of the plurality of RUs comprising:
multiplying the plurality of elements with the data symbols for the first one of the plurality of RUs, respectively.

9. The method of claim 1, further comprising:
generating, based on the cell identification number of the cell and the number of segments in the cell, a second random sequence to be the second intra RU sequence.

10. The method of claim 9, wherein the generating comprises generating the second random sequence with a pseudo random binary sequence (PRBS) generator.

11. The method of claim 1, wherein the transmitter is configured to transmit signals in a fractional frequency reuse (FFR) unit, the method further comprising:
generating, based on the cell identification number of the cell, the number of segments in the cell, and an FFR unit identification number of the FFR unit, a second random sequence to be the second intra RU sequence.

12. The method of claim 2, wherein the inter RU sequence includes a plurality of elements, the applying of the inter RU sequence comprising:
applying a first element of the inter RU sequence to a first one of the plurality of RUs;
wherein the applying of the first element includes multiplying the first element with each of the scrambled pilot symbols and each of the scrambled data symbols in the first one of the plurality of RUs.

13. The method of claim 2, further comprising:
generating, based on the cell identification number of the cell and the number of segments in the cell, a second random sequence to be the inter RU sequence.

14. The method of claim 13, wherein the generating comprises generating the second random sequence with a pseudo random binary sequence (PRBS) generator.

15. Subcarrier scrambling apparatus for use in a transmitter with multiple subcarriers, the transmitter being configured to allocate pilot symbols and data symbols for each of a plurality of resource units (RUs), the apparatus comprising:
a first multiplier configured to apply, for each of the plurality of RUs, a first intra RU sequence to the pilot symbols, to thereby generate a plurality of scrambled pilot symbols;
a second multiplier configured to apply, for each of the plurality of RUs, a second intra RU sequence to the data symbols, to thereby generate a plurality of scrambled data symbols; and
a combiner configured to combine the plurality of scrambled pilot symbols and the plurality of scrambled data symbols to form the plurality of RUs;
wherein the transmitter is configured to serve a cell including one or more segments, the apparatus further comprising:
a first pseudo random binary sequence (PRBS) generator configured to generate a first random sequence, based on a number of segments in the cell; and
a first sequence optimizer configured to optimize the first random sequence to generate the first intra RU sequence, based on a cell identification number of the cell.

16. The apparatus of claim 15, further comprising:
a third multiplier configured to apply an inter RU sequence to the plurality of RUs.

17. The apparatus of claim 15, wherein the transmitter is configured to transmit signals in a fractional frequency reuse (FFR) unit, the apparatus further comprising:
a second pseudo random binary sequence (PRBS) generator configured to generate a second random sequence, based on the cell identification number of the cell and the number of segments in the cell; and
a second sequence optimizer configured to optimize the second random sequence to generate the first intra RU sequence, based on an FFR unit identification number of the FFR unit.

18. The apparatus of claim 15, further comprising:
a second pseudo random binary sequence (PRBS) generator configured to generate a second random sequence to be the second intra RU sequence, based on the cell identification number of the cell and the number of segments in the cell.

* * * * *